United States Patent [19]
Cushman

[11] Patent Number: 5,248,467
[45] Date of Patent: Sep. 28, 1993

[54] INJECTION OF MOLDING MATERIAL INTO MOLDS THAT MAY CONTAIN CORES AND/OR FIBERS

[76] Inventor: William B. Cushman, 1315 Finley Dr., Pensacola, Fla. 32514

[21] Appl. No.: 919,850

[22] Filed: Jul. 27, 1992

[51] Int. Cl.⁵ .................................. B29C 45/26
[52] U.S. Cl. ........................ 264/102; 264/257
[58] Field of Search .............. 264/102, 257, 328.1; 425/546

[56] References Cited

U.S. PATENT DOCUMENTS

| | | | |
|---|---|---|---|
| 4,132,755 | 1/1979 | Johnson | 264/102 |
| 4,248,817 | 2/1981 | Frank | 264/102 |
| 4,256,444 | 3/1981 | Suter | 264/102 |
| 4,412,804 | 11/1983 | Hüther | 264/102 |
| 4,439,386 | 3/1984 | Antczak | 264/102 |
| 4,927,580 | 5/1990 | Nasu et al. | 264/102 |
| 4,997,606 | 3/1991 | Mears et al. | 264/102 |
| 5,059,370 | 10/1991 | Kojima | 264/102 |
| 5,082,615 | 1/1992 | Sakai | 264/102 |

FOREIGN PATENT DOCUMENTS 57-199614 12/1982 Japan .................. 425/169

OTHER PUBLICATIONS

Robinson, Norman W., *The Physical Principles of Ultra-high Vacuum Systems and Equipment*, 1968, pp. 150-213.

*Primary Examiner*—Jill L. Heitbrink

[57] ABSTRACT

An injection molding method and apparatus is disclosed that enables the injection of molding material into molds that may contain fibers, long, oriented fibers, core inserts and/or surface inserts. The method utilizes these steps: first, evacuation of the mold and its contents with the use of a vacuum means to remove gasses, adsorbed and chemisorbed water and other substances, second, injection of material into the mold using an injection pump or atmospheric pressure to force molding material into the mold. Apparatus for the preferred embodiment includes the placement of molds and any mold contents in a vacuum chamber to eliminate a dependence on seals around the mold, and means for injection of molding material under vacuum.

7 Claims, 1 Drawing Sheet

INJECTION OF MOLDING MATERIAL INTO MOLDS THAT MAY CONTAIN CORES AND/OR FIBERS

BACKGROUND OF THE INVENTION

1. Field of the Invention

This invention relates to injection molding and particularly to injection molding of molding material into molds that may contain fibers and/or cores, and apparatus and method therefore.

2. Description of Related Art

Currently available manufacturing techniques can produce composite materials that are far stronger than the best specialty steels. Within a composite material the long, oriented fibers absorb the tensile stresses; the matrix material serves merely to orient and hold the fibers in place. Glass fiber, for example, can be manufactured that will withstand a tensile stress in excess of 700,000 pounds per square inch. This is a far higher stress than any epoxy—or steel, for that matter—could withstand. Unfortunately, manufacturing procedures now used to produce parts with long, oriented fibers, such as glass reinforced epoxy, are expensive and limited to a narrow spectrum of shapes and sizes.

On the other hand, injection molding techniques offer a versatile and inexpensive means of producing high quality parts with fine details and intricate shapes. However, current methods of production do not result in moldings that are strong for a given weight of material. The molding material used is necessarily homogeneous in nature and the stress-absorbing properties of available molding materials are limited. The strength of an injection molding may be increased by mixing short strands of chopped fiber into the molding material, thus producing a composite material. But if chopped strands are included that are long enough, and numerous enough, to significantly affect the strength of the molded part, they will not inject well or at all. Furthermore, the orientation of fiber strands in an injected composite material is random rather than aligned along stress lines. In composites with a homogeneous distribution of short fibers, the bonding and tensile strength of the matrix material becomes the stress limiting factor, not the fibers themselves. Fibers may also be highly eroding and can damage injection machines.

A mold may be pre-loaded with long, oriented fibers prior to injection of molding material. The primary problem molders face when attempting to inject matrix material into a mold that has been pre-loaded with fibers, and possibly core structure such as foam or inserts intended to take a screw or the like, is the fact that air (and sometimes other gasses) tends to become trapped and to displace the matrix material. This problem is exacerbated by the fact that the fibers used must be numerous to be effective and thus provide many small spaces between strands that act as gas traps. Several approaches have been attempted to solve this problem, some of which have been successful. For example, compression molding techniques, which wet the fibers with matrix material prior to placement in the mold and then squeeze excess material out of gaps between mold halves under high pressure, are effective with simple moldings but a complex mold will trap air pockets that ruin the final product. Pultrusion molding is effective but limited to simple shapes with an extrudable cross section. Both compression molding and pultrusion molding are relatively inexpensive.

Vacuum venting will aid injection of matrix material into a mold containing fibers and cores. The vacuum reduces the quantity of gasses in the mold that are later compressed by the matrix material into small, entrapped bubbles. Vacuum venting is not, however, currently used with the purpose of removing the gasses from the molding, but to speed the injection process by reducing internal mold pressure. The quality of the final product made with vacuum venting is still highly dependant on the shape of the mold, the placement of the vent holes, and the location of injection points.

A vacuum will reduce the absolute number of gas molecules remaining in a mold as the gas pressure is reduced, and this fact suggests an extension and improvement to injection molding practice. *First* remove the gasses from the mold and any fibers it contains using a vacuum, and *then* inject the matrix material. This approach to injection molding is no panacea; the use of a vacuum to remove air and gasses from a mold has some disadvantages, such as an increase in equipment costs and process time. But the use of a vacuum when molding also has some unexpected advantages, namely, that given sufficient time before injection of the matrix material a vacuum will remove residual gasses from cracks and crevasses in fiber, tend to remove absorbed and chemisorbed gasses from surfaces of fibers, remove water from the system and generally clean the fiber before the matrix material is introduced (Robinson, Norman W., 1968, *The Physical Principles of Ultra-high Vacuum Systems and Equipment.* Chapman and Hall, Ltd. 11 New Fetter Lane, London EC4, chapters 6 and 7). Cleaning the fibers improves bonding with the matrix material, and therefore the ultimate strength of the final product.

The process of gas extraction from a mold and its contents with a vacuum takes an extended period of time. As the gas pressure within a mold is reduced, the molecular density thins to a point where the mean free path length of molecular travel is longer than the distance between internal surfaces. At this point molecular flow is a function of random elastic collisions of individual molecules with internal surfaces, which may or may not lead to a particular molecule exiting the mold. Eventually, given a low enough pressure external to the mold to assure minimal molecular back flow, most gas molecules will exit. However, absorbed water on internal surfaces of the mold and contents will vaporize as the gas pressure is lowered, causing spaces vacated by other gas molecules to be occupied by water vapor molecules which then must be removed. Chemisorbed atoms that are maintained in an equilibrium surface concentration on internal surfaces by molecular gas pressure also occupy space vacated by other molecules when released and must, in turn, be removed. The effect of volatilizing adsorbed and chemisorbed water and gasses is to increase the internal gas concentration of the mold and contents far above what would be expected with a simple calculation of the space involved. This "desorption load" is not, however, prohibitive in a properly designed production apparatus. Experience with molding a very complex, 76% glass fiber, roughly one-quarter liter volume component, with the relative humidity of about 75%, has shown that adequate gas removal can be accomplished by pumping down to $6 \times 10^{-4}$ mbar for about forty-five minutes through an injection port roughly two millimeters in diameter prior to epoxy injection. Adsorbed water from high humidity appears to be the main source of desorption load and can be significantly alleviated by lowering relative humidity in the working area.

A *vacuum first, injection second* process has no need for an array of vents and risers. Complex and intricate shapes in the part will not trap gasses because there is little gas to trap. Injection of matrix material can be from any location on the mold because there is nothing to displace and no need to consider the flow characteristics of the matrix material in terms of displacing air toward a vent. In the case of a very complex part, or perhaps a very large part, the manufacturer is not rushed by the curing time of the matrix material he uses because the fiber lay up is done dry. Furthermore, conventional injection molding processes that use high pressure usually require expensive steel molds. The method disclosed in this specification can use much simpler molds made of plastic or the like because all pressures are relatively modest.

How much gas must be removed prior to injection of matrix material if a mold is tightly stuffed with fibers? Assume that the final volume of a molding is one liter and 80% of this volume is taken up by fiber. To maximize the strength of a product the ratio of fiber to matrix material should be high, and for glass/epoxy a ratio of 80% glass to 20% epoxy has very good properties. In a one liter mold, then, two hundred milliliters of gas (air, contaminants and water) would remain in the mold after placing 800 milliliters of fiber in it. The gas must be removed, either with venting or with vacuum, to produce a successful molding.

Dual stage vacuum pumps are commercially available that can reduce the gas pressure in the mold to less than $6 \times 10^{-4}$ mbar. Much higher vacuums can be achieved with additional equipment. A vacuum of $6 \times 10^{-4}$ mbar is roughly the point at which oil vapor pressure in the pump equals the vacuum pressure, thus imposing a lower vacuum limit on simple "roughing" pumps. We may now ask the question: If the pressure in the mold is first reduced to $6 \times 10^{-4}$ mbar and matrix material is then injected until the volume of gas is reduced by displacement until it again comes up to atmospheric pressure, what would the residual gas volume be? The ideal gas laws may be stated as:

$$\frac{V_1 P_1}{T_1} = \frac{V_2 P_2}{T_2}$$

substituting:

$$\frac{200 \text{ ml} \cdot 6 \cdot 10^{-4} \text{ mbar}}{298° \text{ K.}} = \frac{0.118 \mu\text{l} \cdot 1013 \text{ mbar}}{298° \text{ K.}}$$

One hundred eighteen nanoliters of gas would remain in a one liter molding. Or, in other words, a bubble of gas roughly 0.6 millimeter in diameter. This is a very small bubble, assuming all the gas remains in one place. Multiple bubbles would be proportionately smaller.

We do not, however, need to accept a bubble even this small. If a turbomolecular pump is added to a two-stage roughing pump, five additional orders of magnitude of vacuum can be achieved—thus reducing the residual gas in a molding proportionately. That is, the residual gas in a one-litter molding would now have a volume of 1.18 picoliter. This is a spherical bubble roughly 6 nanometers in diameter (that is, a diameter roughly 1% of one wavelength of red light). A further reduction in gas bubble size can be made if the matrix material is now injected with a pressure greater than atmospheric. Or, if vacuum in the mold is maintained at a more or less constant level during injection of the matrix material by venting to vacuum during injection, the volume of residual gas is reduced yet again. The calculations above are made to demonstrate the point that there is almost always a bubble size that is small enough to be acceptable as a residual imperfection in a molding, and this may be achieved in a mold of any shape. It must be realized that these calculations are based on the well known ideal gas laws, and as such are only an approximation, albeit a close enough one for our purposes here. Of course the engineer considering these issues must also consider how a vacuum will affect the matrix material used and factor in the additional costs involved with using vacuum equipment. Preliminary production of parts using the vacuum first, injection second process disclosed in this specification have shown no effect on epoxy of a $6 \times 10^{-4}$ mbar vacuum, which is sufficient for most purposes.

Very large and complex structures can be molded using the method disclosed here. When attempting to produce a large complex structure with conventional techniques the matrix material may be curing as work progresses. Laying up the product then becomes a race against the chemistry of the matrix material—and that chemistry imposes a natural limit on size. If the part being made is too complex to make in one operation then there is a problem of bonding the next stage of construction with the previous one, which has hardened and formed a difficult surface to bond to. With the vacuum-injection process disclosed here, days or even years can be taken to place the fiber in the mold as desired, in as complex and large a shape as is needed. When a molding becomes large enough to make the degassing process prohibitively long, multiple vacuum and injection ports can be used to reduce the effective volume served by each. Injection of the matrix material is the last step in the molding process. The injection process occurs in a short time so there is no need to bond surfaces together. The entire structure is injected in one operation.

The method and apparatus disclosed in this specification allow an engineer to approach in practice the theoretical maximum strength per unit weight for many composite systems and does so in a practical, manufacturable fashion.

SUMMARY OF THE INVENTION

An object of this invention is to provide an improved injection molding apparatus and method.

Another object of this invention is to provide an improved injection molding apparatus and method for injection of molding material into molds that may contain fibers, or long, oriented fibers and/or core inserts and/or surface inserts.

Another object of this invention is to provide an improved injection molding apparatus and method for injection of molding material into molds that may contain fibers, or long, oriented fibers and/or core inserts and/or surface inserts when said molding material is a thermoset material.

Another object of this invention is to provide an improved injection molding apparatus and method for injection of molding material into molds that may contain fibers, or long, oriented fibers and/or core inserts and/or surface inserts when said molding material is a thermoplastic material.

Another object of this invention is to provide an improved injection molding apparatus and method for injection of molding material into very large molds that may contain fibers, or long, oriented fibers and/or core inserts and/or surface inserts.

Another object of this invention is to provide an improved injection molding apparatus and method for injection of molding material into molds that may contain fibers, or long, oriented fibers and/or core inserts and/or surface inserts while keeping internal mold pressure low to enable the use of inexpensive molds.

A further object of this invention is to provide an improved injection molding apparatus and method for injection of molding material into molds that may contain fibers, or long, oriented fibers and/or core inserts and/or surface inserts that have adsorbed and chemisorbed gasses and water surface contaminants, and to remove said adsorbed and chemisorbed gasses and water with a vacuum.

These and additional objects of the invention are accomplished by subjecting a mold and its contents to a vacuum prior to injection of molding material.

BRIEF DESCRIPTION OF THE DRAWINGS

A more complete appreciation of the invention will be readily obtained by reference to the following Description of the Preferred Embodiments and the accompanying drawings in which like numerals in different figures represent the same structures or elements. The representations in each of the figures is diagrammatic and no attempt is made to indicate actual scales or precise ratios. Proportional relationships are shown as approximations.

DESCRIPTION OF THE PREFERRED EMBODIMENTS

Figure 1:
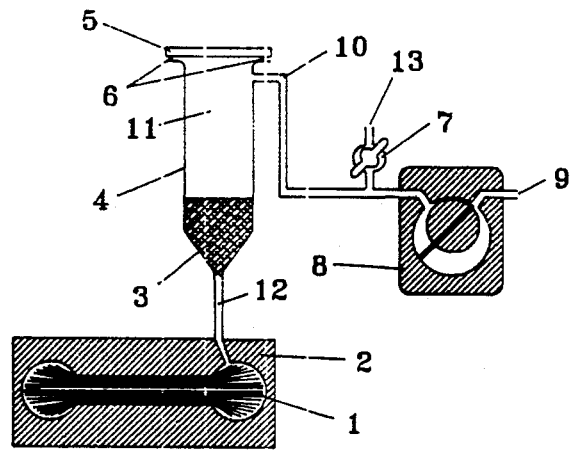
FIG. 1 is a detailed view of the essential elements of an exemplary embodiment of the invention showing their relationship relative to one another.

Before proceeding with the Detailed Description, the terms "composite material," "core insert," "fiber," "heater," "injector pump," "long, oriented fiber," "matrix material," "mold," "molding material," "surface insert," "thermoplastic material," and "thermoset material" are defined below to aid in the reader's understanding of the present invention.

Composite material—a material made from two or more separate materials. Usually fibers embedded in a matrix material. "Fiberglass" is a common example of a composite material, where glass fibers are (typically) embedded in an epoxy or polyester resin matrix.

Core insert—a material that may be placed within a mold to displace other materials into more useful areas, or to provide useful structural properties, or to reduce the weight of the final product. An example would be the use of a structural foam insert in the center of a molding of, say, a propeller blade, to displace fibers and matrix material into desirable structural areas, to provide some structural rigidity, and to reduce weight.

Fiber—a slender filament of structurally strong material. Examples are glass fiber, carbon fiber, ceramic fiber, aramid fiber and polyethylene fiber. When there are multiple fibers they may be collectively referred to as a fiber bundle. That they may be bundled is further meant to imply that these bundles may be manufactured prior to molding and inserted into a mold just prior to subjecting the mold and contents to a vacuum and injection of matrix material.

Heater—Any of several devices well known in the art used to elevate the temperature of some other device or material. A radio-frequency induction heater is convenient for causing matrix material to heat in a vacuum where heat may not be conveniently conveyed by conduction or radiation.

Injector pump—Any of several devices well known in the art used to move matrix material into a mold under positive pressure. Injector pumps are often simple pistons or worm screws arranged to force matrix material along a passageway.

Long, oriented fiber—a fiber purposely oriented so that it may absorb any applied stresses, and long enough to carry any applied stresses with minimal reliance on the bonding strength of matrix material.

Matrix material—a molding material used primarily to hold fibers and inserts in place after molding. Examples of common thermoset matrix materials are epoxy, polyester resin, and polyvinyl resin. The fibers used in properly engineered composite materials are far stronger than the matrix materials, so the fibers tend to shield the matrix material from stress.

Mold—a hollow form made in the shape of a desired product into which molding material can be poured or injected in a molten or plastic state in order to subsequently harden and become the desired product.

Molding material—a material that may be poured or injected into a mold to subsequently harden and form a molding. Molding material is usually either a thermoset or thermoplastic type of material.

Surface insert—a material or device that may be placed within a mold in order to provide a particular feature on the surface of the final product. Some examples are a screw insert or a hardened steel collar around the base of a molded propeller blade to withstand wear as the pitch of the propeller is adjusted during flight.

Thermoplastic material—a material that makes a reversible transition from a solid to a molten or plastic state upon application of heat.

Thermoset material—a material that hardens by chemical action and may not be returned to a molten or plastic state by the application of heat.

FIG. 1 shows a schematic diagram of an exemplary embodiment of the present invention that may be used to inject molding material into a mold either containing or not containing singular or plural: fibers or fiber bundles, core inserts, and or surface inserts. In FIG. 1, 1 is a fiber bundle contained within a mold, 2. Uncured matrix material, 3, is contained within a matrix material chamber, 4, which is sealed by transparent inspection plate, 5, and seal, 6. Valve, 7, is initially closed while vacuum pump, 8, is run to evacuate the gasses from the system out 9 via matrix material chamber evacuation tube, 10. The reduction in pressure at 11 causes any gas within said mold, 2, to exit via injection tube, 12, and bubble through said matrix material, 3, to be eventually evacuated by said vacuum pump. As the pressure is lowered in said mold, absorbed and chemisorbed gasses are removed—effectively cleaning said mold and its contents. Said matrix material is also degassed.

When the gas pressure has been lowered in said mold to a level of vacuum probably approaching about $6 \times 10^{-4}$ mbar, the mean free length of any gas molecules is probably longer than the distance between the walls of said mold and any individual fibers and/or inserts within said mold. That is, the probability of a particular molecule colliding with another molecule becomes low. The only escape path for the molecules within said mold is via said injection tube, 12, which can only be entered by random molecular activity within said mold. Furthermore, additional gas molecules are continually being released within said mold as absorbed and chemisorbed molecules are released from the surfaces and cracks of said mold and any contents. This activity takes time, usually 30–60 minutes for a mold of roughly one-quarter liter volume that is tightly packed with fiber. For a good molding to result, it is imperative that almost all of the gas be removed from a mold and matrix material. Whether or not the gas has been removed can be determined by inspection through transparent inspection plate, 5. If all bubbling and foaming of said matrix material has ceased, then the gasses have essentially been removed from said mold and said matrix material can now be injected. A more sophisticated method to determine gas removal is with the use of a scale. Air weighs about 1.3 gram per liter. If the appropriate volume of gas in a mold is known, then reduction of the mold's weight during gas evaluation is a good indicator of the volume of residual gas. Even if the internal gas volume is not known, weight reduction during gas evaluation will asymptote near the end point.

After almost all residual gas has been removed from said mold, 2, as determined by loss of weight of inspection through said transparent inspection plate, 5, said vacuum pump, 8, is shut down, said valve, 7, is opened to atmosphere, 13 so that air is forced by atmospheric pressure via said matrix material chamber evacuation tube, 10, into the area at 11. Said matrix material 3, is disposed so as to block the opening to said injection tube, 12, and acts as a one-way valve preventing any gasses at 11 from entering said injection tube or said mold. Atmospheric pressure at 11 will force said matrix material, 3, through said injection tube 12 into said mold, 2, where it will fill all void spaces until the internal pressure of said mold equals atmospheric pressure. The internal pressure within said mold, 2, never exceeds atmospheric pressure using this method, thus allowing the use of inexpensive molds.

Figure 2:
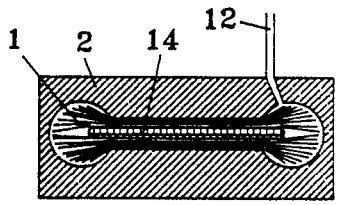
FIG. 2 is a detailed view of a mold used by the invention, showing details of long, oriented fibers and a core insert contained within said mold.

A core insert is often desirable in a particular molding. If, for example, one wanted to produce a composite propeller blade, a core insert of structural foam would be desirable to increase rigidity, help damp vibrations, and to reduce weight. FIG. 2 shows a composite molding with an embedded core insert. In FIG. 2, 1 is fiber, 2 is the mold, 12 is an injection tube and 14 is a core insert such as may be made from closed-cell foam. The core insert must be able to withstand the vacuum used in the process, and also any positive pressure if it is used. During the molding procedure the core insert simply acts as another mold surface. All other aspects of the method are the same as disclosed elsewhere in this specification. The core insert may be placed within a fiber bundle prior to insertion of the bundle into a mold and the fibers will hold it in place.

Figure 3:
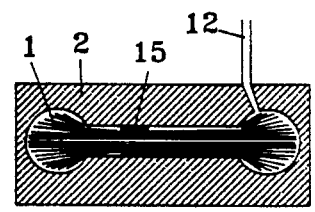
FIG. 3 is a detailed view of a mold used by the invention, showing details of long, oriented fibers and an embedded surface insert contained within said mold.

The injection molding process disclosed herein is also compatible with molding procedures that imbed surface inserts such as threaded plugs or wear rings in the molding. FIG. 3 shows a wear ring embedded in a molding as an example of a surface insert of this type. In FIG. 3, 1 is fiber, 2 is a mold, 12 is an injection tube and 15 is a wear ring made from some hard material such as steel. As with molding with core inserts, during the molding procedure the wear ring (in this example) simply acts as another mold surface. All other aspects of the method are the same as disclosed elsewhere in this specification. The wear ring may be placed around a fiber bundle prior to insertion in the mold.

While the apparatus and method depicted by FIG. 1 is useful in some instances, there are several features that make this approach inconvenient in a production setting. These issues are addressed by a second exemplary embodiment of the present invention, the apparatus and method of FIG. 4. First, the apparatus and method of FIG. 4 addresses the necessity for a long de-gas cycle for the mold to be effectively emptied of all extra gas molecules when the matrix material may be of a type that solidifies rapidly. In a production setting one would indeed want to use a rapidly setting molding material to increase production rates. Another issue of concern is the fact that gasses that remain after evacuation of a mold can be further reduced in volume if gas pressure in said mold is maintained at working vacuum levels during injection of matrix material. A further issue is the fact that provision should be made to make multiple moldings simultaneously. Of particular concern is the fact that it is very difficult to effectively seal a simple mold against atmospheric pressure while it is being evacuated; it is far more convenient if seals don't need to be a factor. Furthermore, some matrix materials are highly viscous and must be actively pumped into a mold; and some matrix materials, the thermoplastic ones in particular, must be heated to achieve a liquid state and allow injection molding.

Figure 4:
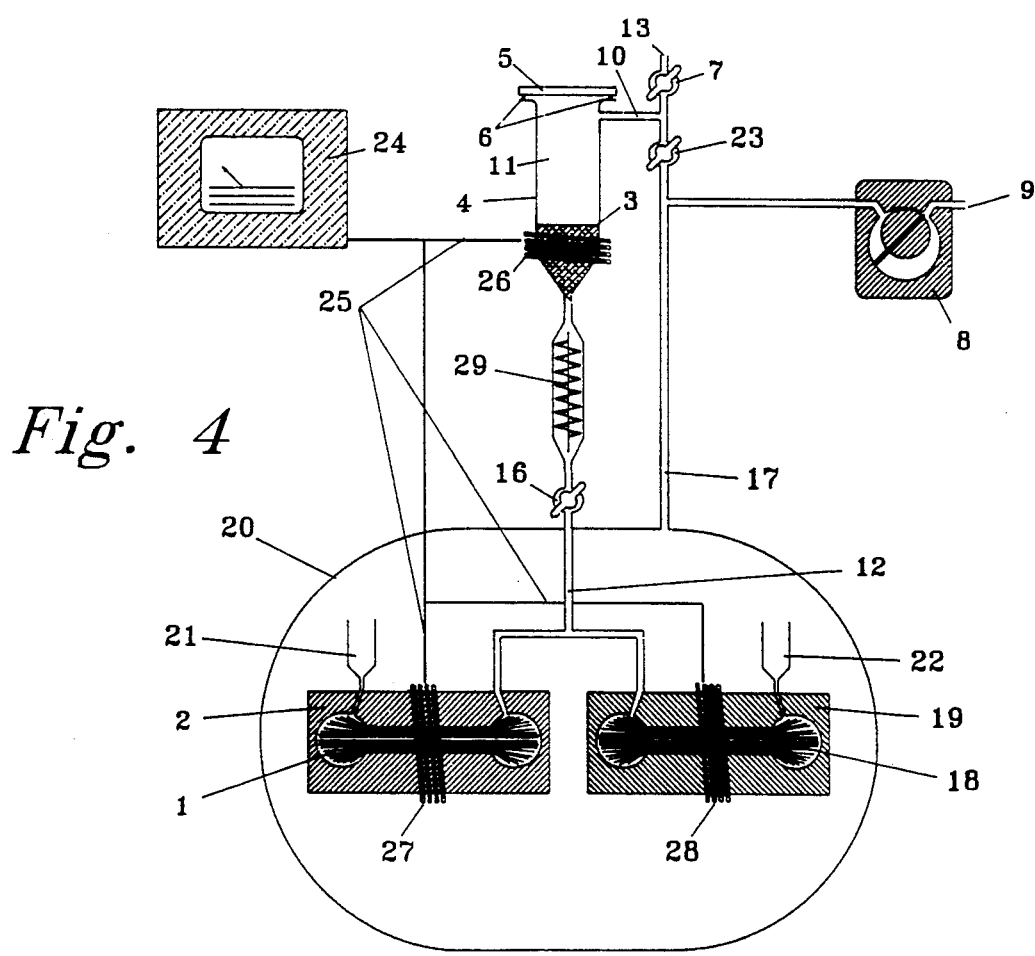
FIG. 4 is a detailed view of the essential elements of an exemplary embodiment of the invention that may be used with either thermoplastic or thermoset molding materials; is capable of injection pressures above atmospheric; is not dependent on critical mold seals; and showing the relationship of elements relative to one another.

In FIG. 4, 1 and 18 are fiber bundles contained within molds 2 and 19 respectively. Valves 16 and 23 are initially closed while vacuum pump, 8, is run to evacuate the gasses from vacuum chamber, 20, out 9 via vacuum chamber evacuation tube, 17. Reduction in pressure within vacuum chamber, 20, causes gasses in molds 2 and 19 to exit via overflow risers 21 and 22 to eventually be evacuated from the system. After sufficient time has elapsed to ensure that all extraneous molecules of gas have been removed from molds 2 and 19, either uncured thermoset or cold thermoplastic matrix material, 3, may be introduced into matrix material chamber, 4, which is then sealed by transparent inspection plate, 5, and seal, 6. Valve 7 is then closed and valve 23 opened. Vacuum pump, 8, continues to run to evacuate the gasses from matrix material chamber, 4, via matrix material chamber evacuation tube, 10. Reduction in pressure at 11 causes matrix material, 3, to be degassed. A radio-frequency induction heating system is also shown on FIG. 4, with 24 a control module, 25 radio-frequency feed lines, 26, 27, and 28 induction heating coils for the matrix material, 3, and molds, 2, and 19. If the matrix material being used is a thermoplastic type, then heat must be applied at this time to melt the matrix material and to bring said molds to a temperature high enough to prevent premature solidification of the matrix material when injected. When matrix material, 3, has been degassed (and heated to a liquid state, if necessary) valve 23 is closed and valves 7 and 16 opened. Vacuum pump, 8, remains running to maintain a low pressure within vacuum chamber, 20. Air at atmospheric pressure then enters the system at 13, passes through valve 7, matrix material chamber evacuation tube, 10, and pressurizes area 11 in matrix material chamber 4. The increase in pressure at 11 may force the matrix material, 3 through valve 16 and injection tube 12 into molds 2 and 19 if the matrix material used does not require positive pumping to force it into the molds. In this case injector pump, 29, is assumed to be a simple unobstructed tube. If, on the other hand, the viscosity of the matrix material is high enough to require positive pumping, then injector pump, 29, is activated at this time to actively pump the matrix material into molds 2 and 19. When matrix material has perfused throughout molds 2 and 19 and accumulated in overflow risers 21 and 22, valve 16 is closed. By maintaining a low pressure during mold injection in vacuum chamber, 20, residual gas in molds 2 and 19 is not compressed to atmospheric pressure as the matrix material is injected until such time as overflow out overflow risers 21 and 22 occurs. In this way a much smaller residual volume of gas is compressed, thus reducing the volume of remaining gasses proportionately. After sufficient time for the matrix material to fill molds 2 and 19, vacuum pump, 8, is shut down, valves 7 and 23 are opened, and vacuum chamber 20 is vented to atmospheric pressure via vacuum chamber evacuation tube, 17. Molds 2 and 19 can then be removed and set aside, or placed in an oven if the matrix material is a thermoset type, to allow the matrix material to harden. Only two molds are shown in FIG. 4, but any number of molds could be accommodated in like manner.

Obviously, many modifications and variations of the present invention are possible in light of the above teachings. It is therefore to be understood that, within the scope of the appended claims, the invention may be practiced otherwise than as specifically described.

I claim:

1. A method for injection of molding material into a mold containing fibers comprising the steps of:
    (a) first, reducing the internal gas pressure of said mold using a vacuum means to a vacuum pressure sufficient to cause adsorbed and chemisorbed atoms and gasses disposed upon or within said fibers to substantially evaporate into a gaseous state, with said vacuum pressure also sufficient to insure that any residual gaseous material remaining within the mold after completion of steps (b) (c) and (d) will compress to a residual volume that is acceptable remaining within the molding from said mold when said molding material is injected into said mold;
    (b) second, holding said reduced internal gas pressure until substantially all adsorbed and chemisorbed atoms and gasses disposed upon or within said fibers have been evaporated from said fibers;
    (c) third, waiting until a sufficient number of said evaporated atoms and residual gasses have had sufficient time to evacuate said mold and fibers through exit ports provided; and,
    (d) fourth, injection of said molding material into said mold using an injection means.

2. A method according to claim 1 in which injection of said molding material into said mold is accomplished while maintaining said reduced internal gas pressure within said mold by continuous application of said vacuum means during the injection of said molding material.

3. A method according to claim 1 in which said mold contains core inserts.

4. A method according to claim 1 in which said mold contains surface inserts.

5. A method according to claim 1 in which said molding material is a matrix material.

6. A method according to claim 1 in which said molding material temperature is controlled with a temperature controlling means.

7. A method according to claim 1 in which said molding material is injected with an injection pump means.

* * * * *